United States Patent [19]

Albrecht et al.

[11] Patent Number: 5,611,430

[45] Date of Patent: Mar. 18, 1997

[54] ADHESIVE-STRIPED BANDOLEER PACKAGING

[75] Inventors: Jeffrey A. Albrecht, Silver Lake; Hector L. Vega, Oak Creek, both of Wis.

[73] Assignee: American Creative Packaging, Oak Creek, Wis.

[21] Appl. No.: 440,663

[22] Filed: May 15, 1995

[51] Int. Cl.⁶ .................................................. B65D 85/67
[52] U.S. Cl. ........................... 206/390; 206/460; 206/820
[58] Field of Search .................................. 206/390, 438, 206/440, 460, 820; 383/37

[56]  References Cited

U.S. PATENT DOCUMENTS

| | | |
|---|---|---|
| 2,095,437 | 10/1937 | Fox . |
| 2,142,194 | 1/1939 | Karfiol . |
| 2,154,521 | 4/1939 | Maxfield . |
| 2,194,451 | 3/1940 | Soubier . |
| 2,323,342 | 7/1943 | McManus et al. . |
| 2,417,497 | 3/1947 | Hulslander, Sr. . |
| 2,636,297 | 4/1953 | Johnson . |
| 2,732,065 | 1/1956 | Marchese ................................ 206/390 |
| 2,832,712 | 4/1958 | Deinlein et al. . |
| 3,199,756 | 8/1965 | Davy ....................................... 206/820 |
| 3,214,080 | 10/1965 | Wolfson . |
| 3,267,623 | 8/1966 | Block . |
| 3,411,978 | 11/1968 | Frohbach et al. . |
| 3,485,349 | 12/1969 | Chaney, Jr. . |
| 3,503,568 | 3/1970 | Galley . |
| 3,524,271 | 8/1970 | Buske . |
| 3,532,574 | 10/1970 | Davis . |
| 3,785,895 | 1/1974 | Ettre et al. . |
| 4,157,410 | 6/1979 | McClintock . |
| 4,268,344 | 5/1981 | Jones . |
| 4,281,762 | 8/1981 | Hattemer . |
| 4,298,158 | 11/1981 | Hoppe et al. . |
| 4,306,656 | 12/1981 | Dahlem . |
| 4,344,557 | 8/1982 | Lerner . |
| 4,359,358 | 11/1982 | Hattemer . |
| 4,401,213 | 8/1983 | Lerner . |
| 4,512,472 | 4/1985 | Järund . |
| 4,529,636 | 7/1985 | Olson . |
| 4,537,586 | 8/1985 | Gale et al. . |
| 4,550,831 | 11/1985 | Whitford . |
| 4,564,108 | 1/1986 | Widlund et al. ........................ 206/820 |
| 4,604,153 | 8/1986 | Melbye . |
| 4,621,732 | 11/1986 | Olson . |
| 4,684,018 | 8/1987 | Järund . |
| 4,694,959 | 9/1987 | Ausnit et al. .......................... 206/390 |
| 4,735,316 | 4/1988 | Fröidh et al. .......................... 206/440 |
| 4,859,083 | 8/1989 | Nocek et al. . |
| 4,863,772 | 9/1989 | Cross . |
| 4,972,657 | 11/1990 | McKee . |
| 5,025,923 | 6/1991 | Okui ....................................... 206/460 |
| 5,281,455 | 1/1994 | Braun et al. . |
| 5,298,104 | 3/1994 | Absher . |
| 5,334,431 | 8/1994 | Longtin . |
| 5,363,966 | 11/1994 | Czech et al. . |
| 5,369,936 | 12/1994 | Callahan et al. . |

Primary Examiner—David T. Fidei
Attorney, Agent, or Firm—Eugene Stephens & Associates

[57]  ABSTRACT

A bandoleer includes a series of articles encased in separate sections of a sleeve. An adhesive stripe extends along the sleeve and is covered by a release liner. The encased articles are further separated by perforations that are formed through both the sleeve and the release liner. A reinforcing tape is applied to a back of the liner to adapt the bandoleer to an automated process for affixing the encased articles to larger packaging or other substrates. The reinforcing tape is bonded to the release liner for supporting perforated lengths of the release liner after separation from the bandoleer.

20 Claims, 5 Drawing Sheets

ADHESIVE-STRIPED BANDOLEER PACKAGING

TECHNICAL FIELD

The invention relates to bandoleer packaging in which a series of packages are interconnected along a continuous length and to methods for making and dispensing such packaging.

BACKGROUND

Bandoleer packaging is widely used for wrapping articles in succession, ranging from food products to printed matter. A series of interconnected packages is formed by filling and sealing individual lengths of a wrapping material. This leaves a succession of articles encased in a sleeve and separated by closed portions of the sleeve.

The wrapping material, which is usually a plastic film, is formed into the sleeve by a continuous longitudinal seal; and the closed portions of the sleeve are formed by lateral seals. The seals are formed by heat and pressure. The closed portions of the sleeve are often perforated so the wrapped articles can be individually detached from the bandoleer.

Bandoleers have been used with automated insertion machines that dispense wrapped articles into larger packages. The bandoleers function as belts for transporting the wrapped articles at a fixed spacing through the machines. The individual wrapped articles of the bandoleer are disconnected in succession and are inserted into a registered succession of the larger packages.

Similar wrapped articles have also been affixed to the exterior of larger packages or other substrates. Although bandoleers are a convenient way of wrapping a series of such articles, manual steps have been required to detach, glue, and affix each article individually to the larger package. Such steps are too time consuming and labor intensive to be sustained for high levels of production.

SUMMARY OF THE INVENTION

Our invention involves an improved bandoleer that can be used in a process for automating the application of wrapped articles to substrates. The bandoleer is made with an adhesive backing for attaching the wrapped articles to the substrates. A special release liner and reinforcer combination adapts the bandoleer to automated processing.

One example of our new bandoleer includes a series of articles encased in a sleeve and separated by closed portions of the sleeve. An adhesive stripe extends along a length of the sleeve and is covered by a release liner. Perforations formed through both the closed portions of the sleeve and the release liner enable individual encased articles to be separated from the bandoleer. A reinforcer located along the release liner supports perforated lengths of the release liner.

Preferably, the reinforcer is a self-adhesive tape that is bonded to a back of the release liner. The tape has a bursting strength greater than the release liner to support the perforated lengths of the release liner, especially after separation from the sleeve. The adhesive stripe can be a single layer of adhesive or a double-sided tape having adhesive layers on both sides.

Our new bandoleer can be fed through an automated application machine to a separating station that separates the release liner and the reinforcer from the sleeve. The encased articles are disconnected from the sleeve along the lines of perforation and are affixed to a substrate. Continuous lengths of the release liner and the reinforcer are wound into a roll for disposal. Without the reinforcer, the perforated lengths of the release liner would be subject to breakage and produce an unwieldy accumulation of scrap in the form of different length sections of the release liner.

Our new bandoleer can be made from separate webs of wrapping material, release liner, and reinforcing tape. The wrapping material is formed into a sleeve encasing articles within a sequence of packages separated by closed portions of the sleeve. An adhesive stripe is carried by either the release liner or the sleeve. For example, the adhesive could be applied to the sleeve or the release liner or the adhesive could be one of two layers of adhesive on a double-sided tape covered by the release liner. The release liner is subsequently laminated to the sleeve, trapping the adhesive stripe between them. A series of weakening lines such as perforations are formed in both the closed portions of the sleeve and the release liner. The reinforcing tape is attached to the release liner for reinforcing the weakening lines in the sleeve and the release liner.

DRAWINGS

DETAILED DESCRIPTION

Figure 1:
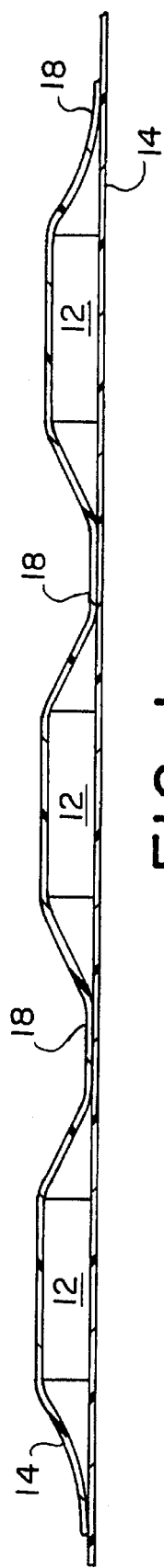
FIG. 1 is cross-sectional side view through a bandoleer.
Figure 2:
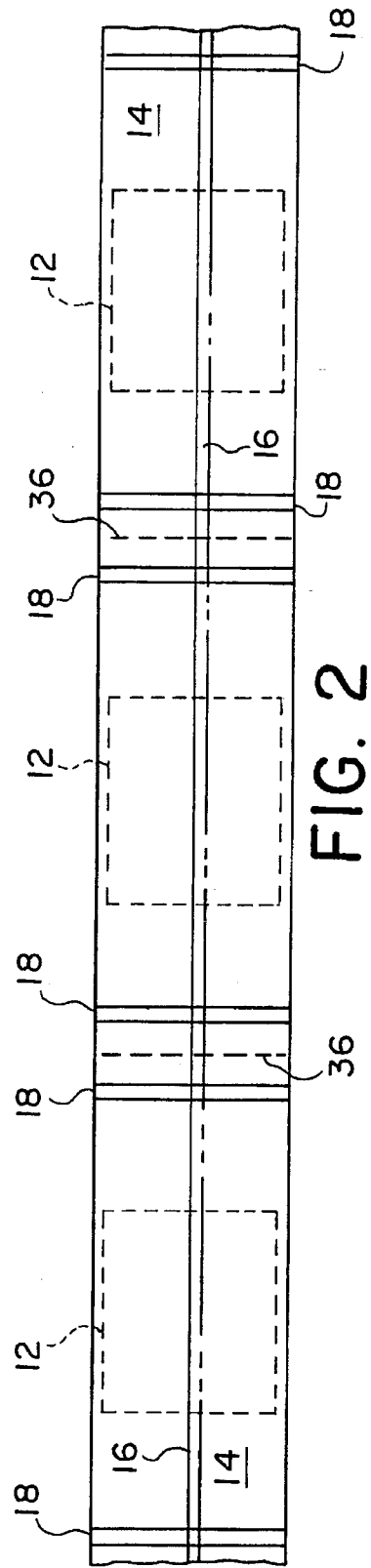
FIG. 2 is a bottom view of the same bandoleer showing longitudinal and lateral seams.
Figure 3:
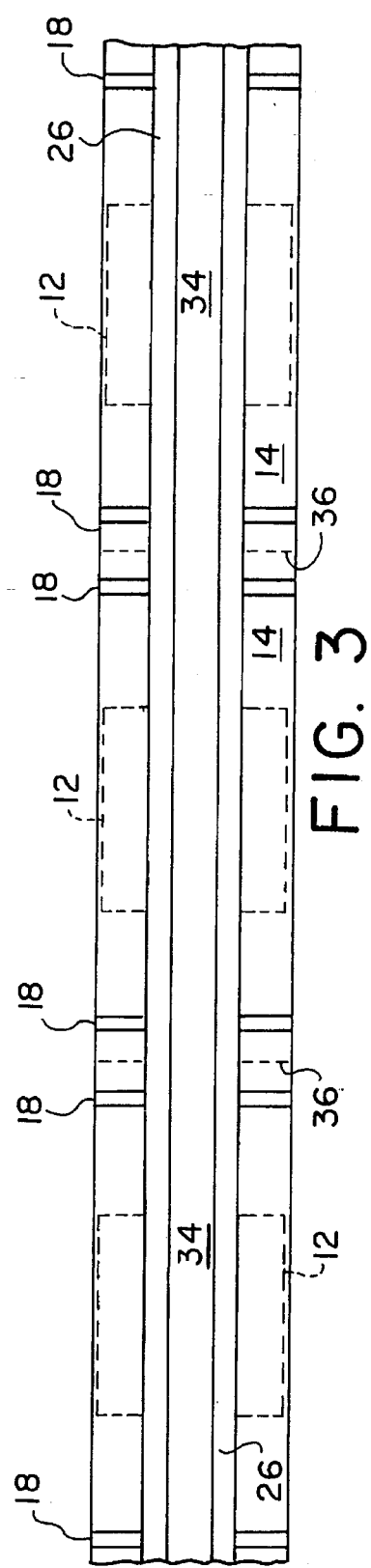
FIG. 3 is a bottom view of the same bandoleer laminated with a release liner and a reinforcer.

A preferred embodiment of our new bandoleer 10 is shown in FIGS. 1–4. A series of articles 12, such as printed matter, samples, or other objects, is encased in a sleeve 14 made from a wrapping material such as a plastic film. The sleeve 14 has a longitudinal seam 16 and a plurality of lateral seams 18 that encase the articles 12 between closed portions of the sleeve 14. The seams 16 and 18 are formed by application of heat and pressure to selected portions of the sleeve 14, but adhesives or other forms of bonding could also be used.

A first layer of adhesive 20 is located along a length of the sleeve 14, preferably as a stripe that covers the longitudinal seam 16 along with portions of the lateral seams 18. The adhesive 20 is preferably a pressure-sensitive adhesive, but further characteristics of the adhesive 20 depend on its intended use. A release coating 22 on a front face 24 of a release liner 26 is positioned adjacent to the adhesive 20 for protecting the adhesive 20 prior to use. The release coating 22 can have a silicon base, but its particular composition depends on the choice of adhesive. The release liner 26 can be a paper such as kraft or other materials including films.

A second layer of adhesive 30 on a front face 32 of a reinforcer 34 is positioned adjacent to a back face 28 of the release liner 26. Preferably, the adhesive 30 permanently bonds the reinforcer 34 to the release liner 26. The reinforcer 34 is preferably mylar or polypropylene film, and the reinforcer and the adhesive 30 together preferably comprise a self-adhesive tape. However, other types of reinforcers could also be used including paper, mesh, or threads. The release liner 26 is preferably centered on the bandoleer 12; the reinforcer 34 is preferably centered on the release liner 26. Also, the release liner 26 is preferably narrower in width than the sleeve 14, and the reinforcer 34 is preferably narrower in width than the release liner 26 to provide wide tolerances for centering.

Perforations 36 or other types of weakening lines are formed through the closed portions of the sleeve 14 and the release liner 26 but do not penetrate the reinforcer 34. Preferably, the reinforcer has a bursting strength greater than perforated lengths of the release liner 26 or sleeve 14 to prevent the encased articles 12 from being separated from the bandoleer 10 until the reinforcer 34 together with the release liner 26 is removed.

Figure 4:
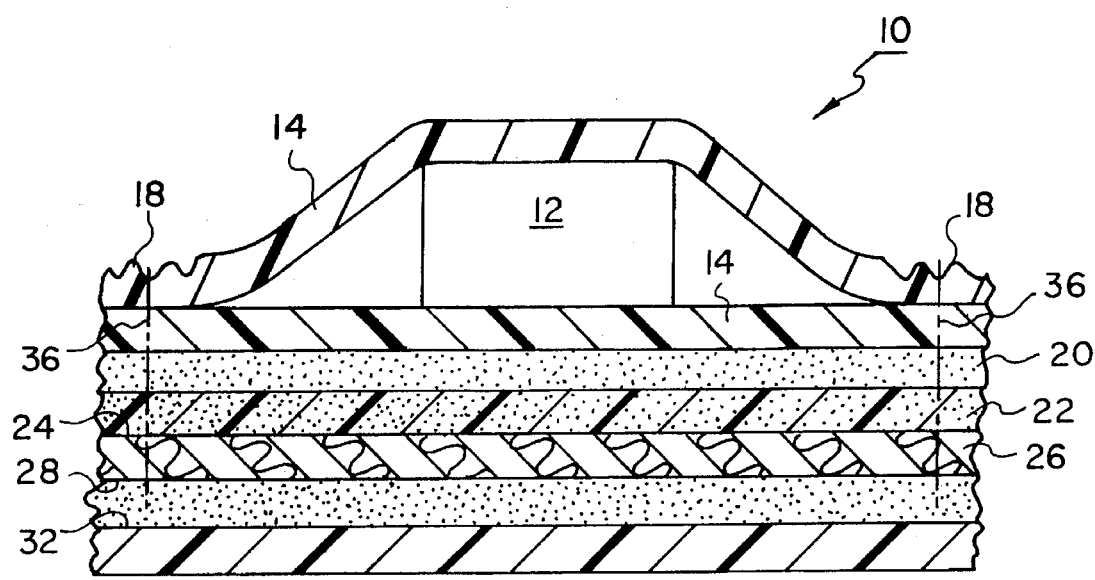
FIG. 4 is a cut-away cross-sectional side view of the laminated bandoleer enlarged to better reveal its layered construction.

An alternative bandoleer 40 shown in FIG. 4 is labeled with the same reference numerals as the preceding embodiment for all corresponding features but also includes a backing layer 42 and a third layer of adhesive 44. The backing layer 42, which is preferably a resin film, separates the first layer of adhesive 20 and the third layer of adhesive 44. The first layer of adhesive 20 bonds the backing layer 42 to the sleeve 14, and the third layer of adhesive 44 assumes the role of the first layer of adhesive 20 from the preceding embodiment. Preferably, the backing layer 42 and the two layers of adhesive 20 and 44 comprise a double-sided tape. The perforations 36 also extend through the layers 42 and 44 so the adhesive layer 44 remains with the individual encased articles 12 after separation from the bandoleer 40.

Figure 6:
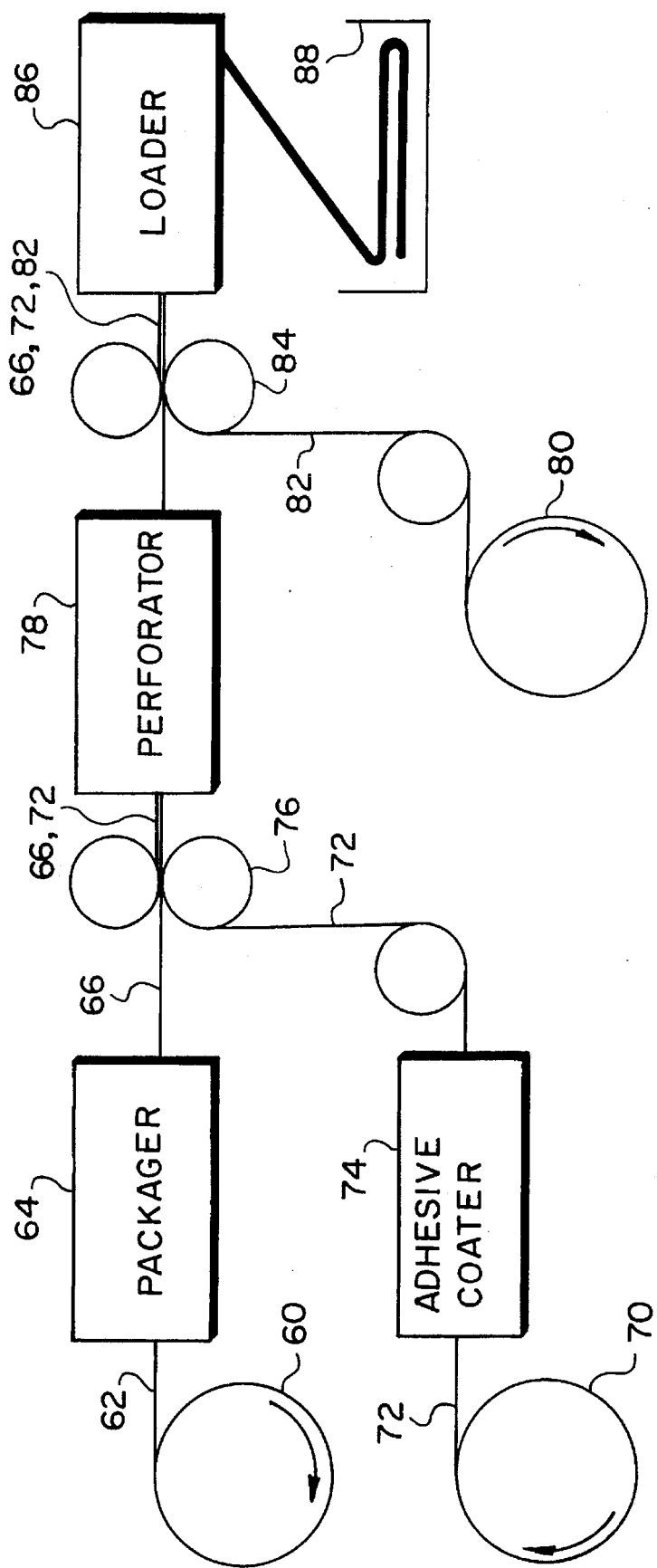
FIG. 6 is a schematic diagram of an in-line system for making the bandoleer of FIGS. 1–4.

The bandoleer 10 of FIGS. 1–4 can be made according to a process schematically depicted in FIG. 6. A roll 60 of wrapping material 62 is unwound into a packager 64 that fills and seals individual lengths of the wrapping material 62 forming a series of interconnected packages 66. Simultaneously, a roll 70 of release liner 72 is unwound into an adhesive coater 74 that applies a layer of adhesive, preferably in the form of a stripe, on a release surface of the release liner 72. The roll 70 could also be precoated with the layer of adhesive. The series of packages 66 and the adhesive coated release liner 72 are aligned and laminated together by rollers 76; and the combined lamination 66, 72 is fed into a perforator 78 that forms a series of perforated lines through the combined lamination 66, 72 between the interconnected packages 66.

A roll 80 of tape 82 or other form of reinforcement is unwound and fed to a pair of rollers 84 for lamination to the release liner 72. The further combined lamination 66, 72, and 82, which corresponds to the bandoleer 10, is fed into a loader 86 for stacking fixed lengths of the further combined lamination 66, 72, 82 in a carton 88. This loading operation can be carried out manually or automatically.

Alternatively, the loader 86 could be used to wind the further combined lamination 66, 72, 82 into a roll (not shown). Also, release could be applied as a part of the same in-line system to the release liner 72, and the adhesive could be first applied to the series of packages 66 instead of the release liner 72. A separate adhesive coater could be used to apply a permanent adhesive to the tape 82 or to a back of the release liner 72 prior to laminating the tape 82 to the liner 72, or the tape 82 could be a self-adhesive tape.

Figure 5:
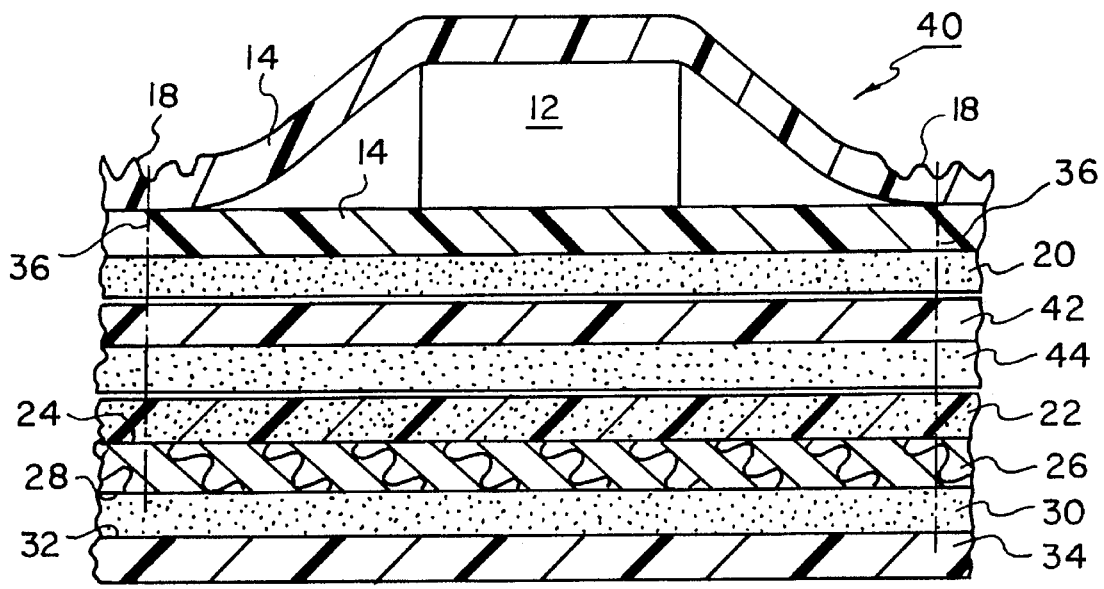
FIG. 5 is cut-away cross-sectional side view of a similar bandoleer having additional layers.
Figure 7:
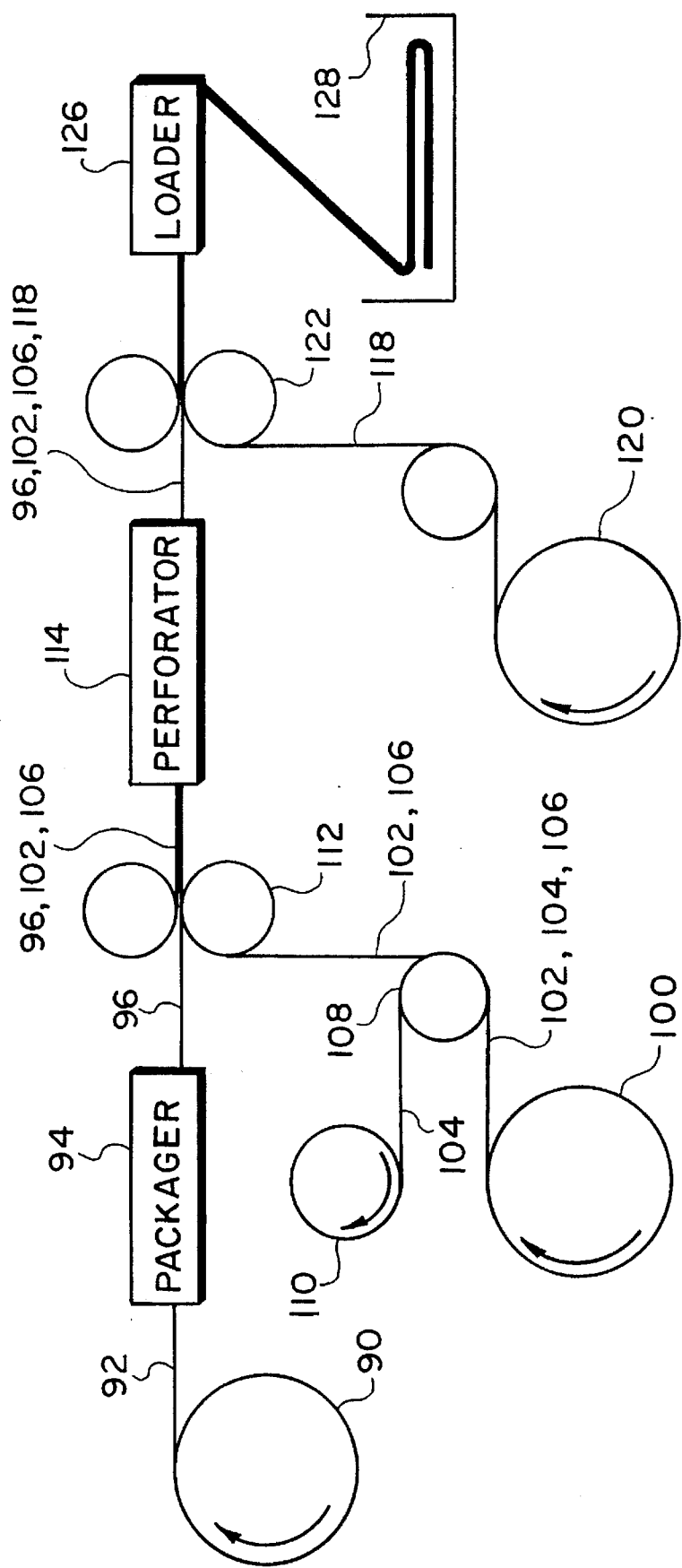
FIG. 7 is a schematic diagram of a similar in-line system for making the bandoleer of FIG. 5.

The bandoleer 40 of FIG. 5 can be made according to a similar process depicted in FIG. 7. A roller 90 unwinds wrapping material 92 into a packager 94 that forms the wrapping material 92 into a sleeve for encasing articles within a sequence of packages 96 separated by closed portions of the sleeve. A roller 100 unwinds a double-sided tape 102 protected by release liners 104 and 106 covering adhesives on both sides of the double-sided tape 102. However, one of the release liners 104, which can be referred to as a temporary release liner, is separated from the double-sided tape 102 at a roller 108 and is rewound into a roll 110 for disposal as scrap. The double-sided tape 102 and the remaining release liner 106 are aligned and laminated to the sequence of packages 96 by a pair of rollers 112. The adhesive exposed by removal of the temporary release liner 104 bonds the double-sided tape 102 to the sequence of packages 96.

The combined laminate 96, 102, and 106 is fed into a perforator 114 that forms a series of cuts through the closed portions of the sleeve as well as through the double-sided tape 102 and the release liner 106. The perforations allow the combined laminate 96, 102, and 106 to be separated into individual packages at a predetermined bursting force.

Similar to the preceding embodiment, a tape 118 or other form of reinforcement is unwound from a roll 120 and is fed to a pair of rollers 122 for laminating the tape 118 to the combined laminate 96, 102, and 106. Preferably, the tape 118 is a self-adhesive tape so adhesive does not have to be subsequently applied. The further combined laminate 96, 102, 106, and 118 resembling the bandoleer 40 is fed into the loader 126 for stacking the further combined laminate 96, 102, 106, and 118 into a carton 128.

Figure 8:
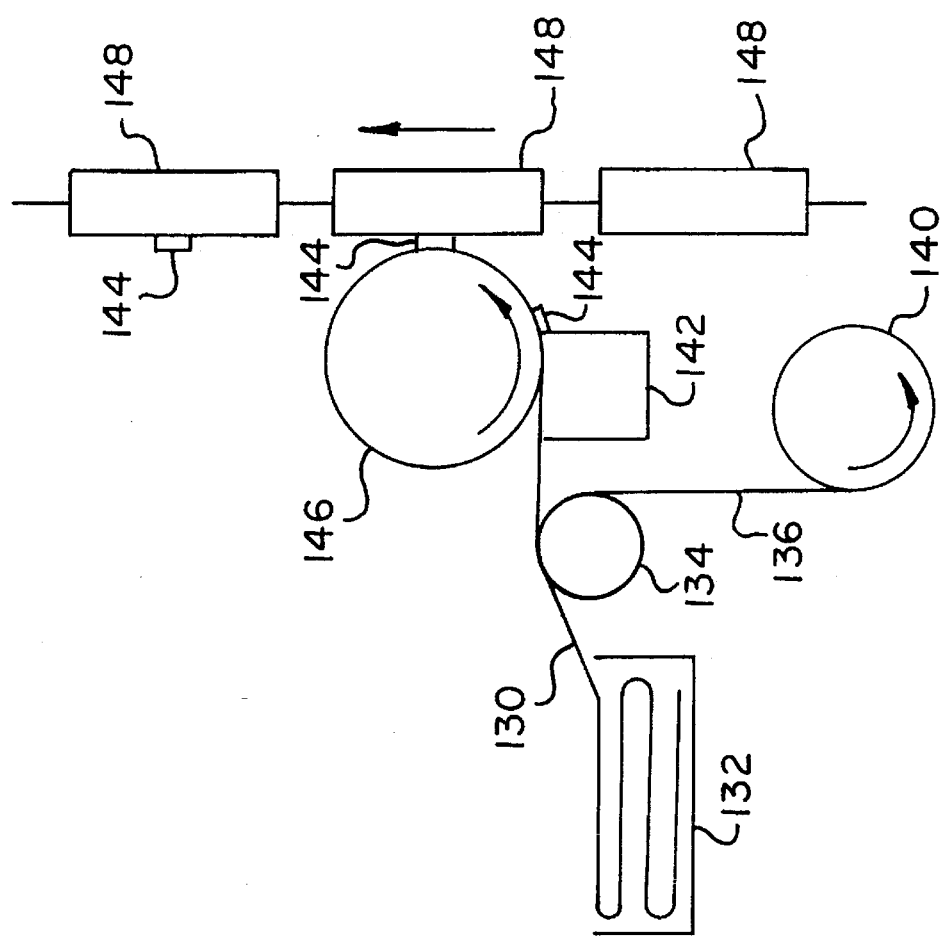
FIG. 8 is a schematic diagram of an automated system for affixing individual packages of the bandoleer to a succession of larger packages.

An automated process for affixing our new bandoleers, including the bandoleers 10 and 40, is depicted by FIG. 8. A bandoleer 130 of interconnected packages is fed from a carton 132 around a roller 134 that separates a reinforced release liner 136 from the bandoleer 130 exposing an adhesive stripe on the interconnected packages. The separated liner 136 is rewound into roll 140 for collecting continuous lengths of the liner 136 as scrap. The remaining bandoleer 130 passes through a burster 142 that disconnects the interconnected packages of the bandoleer 130 along respective weakening lines such as perforations into a succession of individual packages 144. A roller 146 or other form of applicator affixes the succession of individual packages 144 to a registered succession of larger packages 148 or other substrates including boxes, bags, cans, cartons, cards, and wraps. For instance, wrapped recipe books could be affixed to frozen food packages.

We claim:

1. Adhesive-striped bandoleer packaging comprising:

a series of articles encased in a sleeve and separated by closed portions of said sleeve;

an adhesive stripe located along said sleeve;

a release liner covering said adhesive;

perforations formed through both said closed portions of the sleeve and said release liner; and a reinforcer located along said release liner for supporting perforated lengths of said release liner after removal from said sleeve.

2. The packaging of claim 1 in which said release liner has a front face adjacent to said adhesive stripe and a back face adjacent to said reinforcer.

3. The packaging of claim 2 in which said reinforcer is attached to said back face of the release liner.

4. The packaging of claim 3 in which said reinforcer is a tape that is adhesively bonded to said back face of the release liner.

5. The packaging of claim 4 in which said reinforcer is a self-adhesive tape.

6. The packaging of claim 3 in which said reinforcer has a bursting strength greater than that of said perforated lengths of said release liner.

7. The packaging of claim 1 in which said sleeve has a longitudinal seam that extends along said series of encased articles, and said adhesive stripe covers said seam.

8. The packaging of claim 7 in which said sleeve has a series of lateral seams that form said closed portions of said sleeve.

9. The packaging of claim 8 in which said adhesive stripe also covers portions of said lateral seams.

10. The packaging of claim 9 in which said adhesive stripe is a double-sided tape having layers of adhesive on opposite sides.

11. The packaging of claim 10 in which said perforations are also formed through said double-sided tape.

12. Self-adhesive bandoleer packaging comprising:

a series of interconnected packages formed by filling and sealing individual lengths of a wrapping material;

an adhesive applied to said series of interconnected packages;

a release liner laminated to said series of interconnected packages having a front face forming a release surface for said adhesive;

said interconnected packages being separated by a weakening line that permits said interconnected packages to be disconnected; and a reinforcer applied to a back face of said release liner to prevent said interconnected packages from being disconnected until said release liner is removed.

13. The packaging of claim 12 in which said weakening line is formed through both said wrapping material and said release liner.

14. The packaging of claim 13 in which said weakening line is formed by perforations through both said wrapping material and said release liner.

15. The packaging of claim 12 in which said reinforcer is a tape bonded to said back surface of the release liner.

16. The packaging of claim 15 in which said reinforcer is a self-adhesive tape.

17. The packaging of claim 15 in which said release liner and said self-adhesive tape have respective widths, and said width of the release liner is greater than said width of the tape to avoid bonding said tape to said wrapping material.

18. The packaging of claim 12 in which said adhesive is a double-sided tape having layers of adhesive on opposite sides.

19. The packaging of claim 18 in which said weakening line is formed through said wrapping material, said double-sided tape, and said release liner.

20. The packaging of claim 19 in which said weakening line is formed by perforations through said wrapping material, said double-sided tape, and said release liner.

* * * * *